United States Patent [19]

Longaker

[11] Patent Number: 4,751,512

[45] Date of Patent: Jun. 14, 1988

[54] DIFFERENTIAL NAVIGATION SYSTEM FOR REMOTE MOBILE USERS

[75] Inventor: Harold L. Longaker, Houston, Tex.

[73] Assignee: Oceanonics, Inc., Houston, Tex.

[21] Appl. No.: 821,009

[22] Filed: Jan. 21, 1986

[51] Int. Cl.$^4$ .................. G01S 5/02; H04B 7/185
[52] U.S. Cl. .................. 342/357; 342/356; 342/361; 342/457
[58] Field of Search ............ 342/357, 356, 361, 362, 342/457

[56] References Cited

U.S. PATENT DOCUMENTS

| | | | |
|---|---|---|---|
| 3,544,995 | 12/1970 | Bottenberg et al. | 342/357 |
| 4,077,005 | 2/1978 | Bishop | 342/357 |
| 4,276,553 | 6/1981 | Schaefer | 342/357 |
| 4,359,733 | 10/1982 | O'Neill | 343/100 |
| 4,445,118 | 4/1984 | Taylor et al. | 342/357 |
| 4,455,651 | 6/1984 | Baran | 370/104 |

OTHER PUBLICATIONS

Ralph Eschenbach & Roger Helkey, "Performance/Cost Ratio Optimized for GPS Receiver Design", *Microwave Systems News*, Nov. 1984, pp. 43–46, 51–52.

Robert P. Denaro, "NAVSTAR Global Positioning System Offers Unprecedented Navigational Accuracy", *Microwave Systems News*, Nov. 1984, pp. 54, 58–59, 62, 65, 67–68, 70, 75–78, 83.

Bradford W. Parkinson, "GPS Accuracy and Reliability Improved with Pseudolites", *Microwave Systems News*, Nov. 1984, pp. 85–86, 91–94, 97.

Rudolph M. Kalafus et al, Recommendations of Special Committee 104 Differential Navstar/GPS Service, Feb. 20, 1985.

K. M. Keen, "Method Permits Gain Estimation for Very-Wide-Beam, Satellite-Terminal Antennas", *Communications Technology*, Oct. 1985, pp. 83–84, 87.

"Filter Center", *Aviation Week & Space Technology*, Aug. 12, 1985, p. 69.

Philip J. Klass, "Arinc Proposes Satellite-Based Surveillance, Data Link System", *Aviation Week & Space Technology*, Aug. 26, 1985, pp. 14–15.

Edwin B. Parker, "Micro Earth Stations as Personal Computer Accessories", *Proceedings of the IEEE*, vol. 72, No. 11, Nov. 1984, pp. 1526–1531.

Edwin B. Parker, "Micro Earth Stations Make Business Satcom Affordable", *Microwave Systems News*, Nov. 1982.

*Wideband Antennas and Control Systems*, Catalog 1984/1985, pp. 52–55, 68, 69.

*Primary Examiner*—Theodore M. Blum
*Assistant Examiner*—David Cain
*Attorney, Agent, or Firm*—Vaden, Eickenroht, Thompson & Boulware

[57] ABSTRACT

A differential navigation system applicable to mobile users and covering a wide range geographic area, including remote regions. A reference receiver of known location tracks a navigation information service, computes differential data with respect to that information and communicates the data to a transmitting unit. The transmitting unit transmits differential data via a commercial geosynchronous earth satellite relay to a mobile user located no more than 500 miles from the reference receiver, but possibly located in a remote region. The mobile user receives the relayed signal with a non-directional, circularly polarized, non-stabilized antenna. Reception at a sufficient data rate with sufficient reliability is made possible by formatting the differential data using spread spectrum techniques.

11 Claims, 4 Drawing Sheets

DIFFERENTIAL NAVIGATION SYSTEM FOR REMOTE MOBILE USERS

BACKGROUND OF THE INVENTION

1. Field of the Invention

This invention relates to continuous navigation systems for determining the location of bodies relative to a coordinate systems, such as the WGS-72, or to other bodies. More particularly, this invention relates to low cost differential navigation systems for determining the location of potentially unstable and remote mobile units.

2. Description of the Prior Art

Both public and private navigation information services provide navigation information to the general public. For instance, LORAN-C, developed by the Department of Defense, is a government provided radio navigation service predominantly for civil marine use in the United States coastal areas. VOR, VOR/DME, and TACAN provide basic guidance for inland air navigation in the United States. Due to the large network of ground installations the coverage and availability in the United States is quite high. DECCA is a major worldwide navigation information service for air and marine users. TRANSIT is a world-wide space based navigation information service consisting of four or more satellites in approximately 600 nautical mile polar orbits. There are a number of other radiolocation services privately developed and operated, each having their area of application, strengths and weaknesses.

NAVSTAR Global Position System (GPS) is a world-wide satellite navigation information service being developed by the Department of Defense. NAVSTAR GPS should become operational between 1987 and 1989, providing position and velocity information in three dimensions, as well as precise time, to users around the globe, 24 hours a day.

NAVSTAR utilizes two frequencies. One frequency contains both "coarse" and "precise" information for navigation and positioning. The second frequency contains only the "precise" information. The "precise" information is to be available only to the military. The current plan is to make the "coarse" information available to civilian users at an accuracy level of about 100 meters.

The accuracy and precision of navigation based on any navigation service information is enhanced if the user operates in the differential mode. Generally speaking operation in the differential mode involves combining navigation information received at two different receivers where the location of one of the receivers is well-known. By combining the data, the location of the other receiver can be determined with greater accuracy than would be possible through using the data received by that other receiver alone. Using data from both receivers permits compensation for errors in the navigation system information.

Specifically, the differential mode can take many forms. One common mode of differential operation is where a reference receiver of known location takes note of the difference between its known location and its location predicted by using the navigation service information. This difference reflects errors in the information received. The errors could be deliberate errors introduced into the data for security reasons, atmospheric errors caused by the ionoshpere and troposphere, errors in the knowledge of the actual location of a navigation information service component, equipment or clock errors. These errors are key limitations on the level of accuracy and precision achievable with the navigation service. The detection and transmission to a receiver whose location is being determined permits an improvement in the level of accuracy and precision achievable.

Navigation information errors detected by a reference receiver will be largely reflected in the navigation information received by all users near the reference station. Communication of some measure of these errors to users in the vicinity of the reference receiver enhances the accuracy with which the users can calculate their location. As the distance between the user and the reference station increases, the level of enchanced accuracy achieved in the differential mode declines. This decrease is primarily due to variations in the atmosphere. Differential corrections from a reference receiver are generally useable up to a radius of 500 miles from the reference receiver. (Thus, to serve a wide geographic area, reference receivers would need to be stationed approximately every 1,000 miles.)

When the "coarse" NAVSTAR information is utilized in the differential mode it is believed that the level of positioning accuracy will improve from the 100 meter range to the one to five meter range. There are many commercial uses for a low cost, reliable navigation system with an accuracy in the one to five meter range. Many of these uses are by unstable mobile units in remote geographic locations.

Use of the differential mode requires a means for communicating differential data from a reference receiver to a user. For maximum effectiveness users should receive differential data every few seconds. For broad application of a system which includes reference receivers stationed approximately every 1,000 miles, the communication link must cover a wide geographic area, including remote regions. For commercial feasibility, the communication link must be low cost and highly reliable over long periods of continued use.

Standard radio transmissions have constituted the communications link for differential navigation systems utilized to date. However, as shown below, radio transmissions lack the low cost, the range and the high reliability over long periods of continued use to serve as a communication link for a reliable, continuous navigation system serving a wide geographic area including remote regions.

A differential navigation system communication link falls into the Federal Communications Commission classification of a radiolocation service. There are a number of frequencies that can be used for a radiolocation service. They are:

1.85—2.0 MHz
216—225 MHz
420—450 MHz
890—942 MHz
1215—1300 MHz

The frequencies at 216 MHz and higher are good for only "line-of-sight" communication. They do not meet the criteria for large area coverage. The band at 1.85—2.0 MHz would be expected to give adequate area coverage over water but not over land where the surface conductivity is low. Sky wave interference at night would affect the reliability of this band. Atmospheric conditions such as thunderstorms would also affect reliability.

The sub carrier portion of commercial FM stations or the sub audio portion of commercial AM stations could be used for the communication link. In neither case would the expected area of coverage be greater than 100 miles. Additionally, the requirements for a 24-hour/day communication link would not always be possible.

This invention solves the problem of a virtually continuous, high range, low cost, highly reliably communication link between reference units of known location and potentially unstable mobile units spread over a wide geographic area, including remote regions. This invention solves the communication link problem through specification of a commercial geosynchoronous linearly polarized earth satellite transponder as a relay for the differential navigation data to a low cost non-directional, non-stable, circularly polarized antenna located on the mobile unit. Reliable reception at the low cost, non-stable antenna is made possible through selected formatting of the data utilizing spread spectrum techniques.

The specification of an earth satellite relay satisfies the broad base requirements of the system for communication to users over a broad geographic area, including remote regions. Moreover, satellite communication links, due to their relative immunity from atmospheric disturbances, are more reliable than standard terrestrial ones.

When considered from the point of view of a network of reference receivers, a satellite communication link is also cost effective. Each reference receiver in the network can be linked to a central master earth station. The data from the various reference receivers can be multiplexed at the master earth station and then uplinked to the satellite. The satellite retransmits the data in a footprint covering, say, North America. The users of the differential correction communication link have an antenna and receiver to receive the correction terms. The user's receiver selects the data from the appropriate reference receiver and applies it to its own solution. Any number of users can use the same data from the satellite communication link.

Conventional commercial satellite receivers employ linearly polarized directional dish antennas to reliably acquire relayed data from commercial geosynchronous earth satellite transponders. According to the conventional scheme, if the user of a satellite communication link is mobile, that is subject to change in latitude, longitude or altitude, and non-stationary, that is subject to change in roll, pitch and yaw, some method must be used to keep the directional antenna pointing at the satellite. Ships that currently receive satellite data utilize expensive stabilized platforms for maintaining the proper orientation of the directional antenna. Stabilized platforms would violate this system's requirement of low cost.

According to this invention, to avoid the cost of a stabilized platform, or in situations where a stabilized platform would be impossible, the mobile user receives the relayed linearly polarized signals from the commercial satellite transponder with a low cost circularly polarized, non-stabilized, non-directional antenna. Such an antenna has a low signal to noise ratio. One would anticipate any attempt to receive commercial geosynchronous satellite transmissions with this antenna would exhibit a high data error rate. The high data error rate is virtually eliminated and the requirement of reliable reception is met, by condensing the differential data into a minimal set of information and formatting it onto the relayed signal using spread spectrum techniques.

Formatting a signal with spread spectrum techniques can yield a process gain that greatly enhances reception. However, such formatting also sacrifices data rate. Formatting for reliable reception by a circular polarized, non-stabilized, non-directional antenna results in a great sacrifice of data rate, especially when the data is relayed by a linearly polarized commercial geosynchronous earth satellite transponder.

As stated previously, high accuracy navigation requires a differential data update virtually continuously, or every few seconds. Through appropriate balancing of parameters this invention satisfies such data rate requirements. By formatting the differential data into a minimal set of information and utilizing spread spectrum techniques, this system achieves the required rate of one set of differential data relating to each of several navigation source units every few seconds. In so doing, this system maintains reliable reception of the data by low cost antennas located on mobile users spread over a broad geographic area, including remote regions.

Therefore, it is an object of this invention to provide a commercially feasible, low cost, differential navigation system applicable to unstable mobile users spread over a wide geographic area, including remote regions. The system is commercially feasible because it offers an almost continuous differential data update with high reliability at far range and low cost. The system accomplishes this objective by utilizing a geosynchronous commercial earth satellite relay for the communication link for the differential corrections. The differential correction data is condensed and formatted using spread spectrum techniques. The linearly polarized commercially relayed signal is received by the mobile user with a low cost, non-directional, non-stable circularly polarized antenna.

It is another feature of the present invention to provide a differential navigation system that operates with the navigation information from NAVSTAR GPS.

It is a further feature of the present invention to provide an improved differential navigation system wherein the differential data is transmitted from the reference receiver to the up-link earth formatting and transmitting unit using an earth satellite link.

It is another feature of the present invention to provide an improved differential navigation system wherein the navigation information upon which the differential data is based and the navigation information used by the mobile unit to compute location are the same information.

SUMMARY OF THE INVENTION

This invention provides a highly accurate differential navigation system that meets the requirements of maximum effectiveness, application over a broad geographic area, low cost, and reliability during long periods of continuous use by possibly remote non-stable mobile users. The communication link between the reference receiver and mobile users for the differential data utilizes a commercial geosynchronous earth satellite relay. The differential data is condensed into a minimal set of information and formatted using spread spectrum techniques, thereby making possible reliable timely reception from the linearly polarized satellite transponder by circularly polarized, non-directional, non-stable antennas.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the drawings, which drawings form a part of this specification. Is to be noted, however, that the appended drawings illustrate only a typical embodiment of the invention and are therefore not to be considered limiting of its scope, for the invention may admit to other equally effective embodiments.

In the Drawings.

DESCRIPTION OF THE PREFERRED EMBODIMENTS

It should be understood as used in this application that "non-stable" implies an antenna base that does not maintain the antenna pointed in a fixed direction. "Non-directional", as applied to an antenna, means an antenna or antenna combination which receives signals in approximately 360° of azimuth and in at least 50° in elevation from the vertical. As used in this application, "remote" is intended to imply distance greater than line of sight. "Mobile" means that which at least occasionally moves. "Location" as used is intened to imply not only position, but also rate of change of position, i.e. velocity, and rate of change of velocity, i.e. acceleration. Location could be computed relative to other bodies or any one of a number of coordinate systems. It should be further understood that although the system is designed to be applicable to mobile users spread over a wide geographic area, including remote regions, it is equally applicable to non-remote stationary users and may well provide sufficient cost advantages to be the desirable system for any user of navigation information services.

Figure 1:
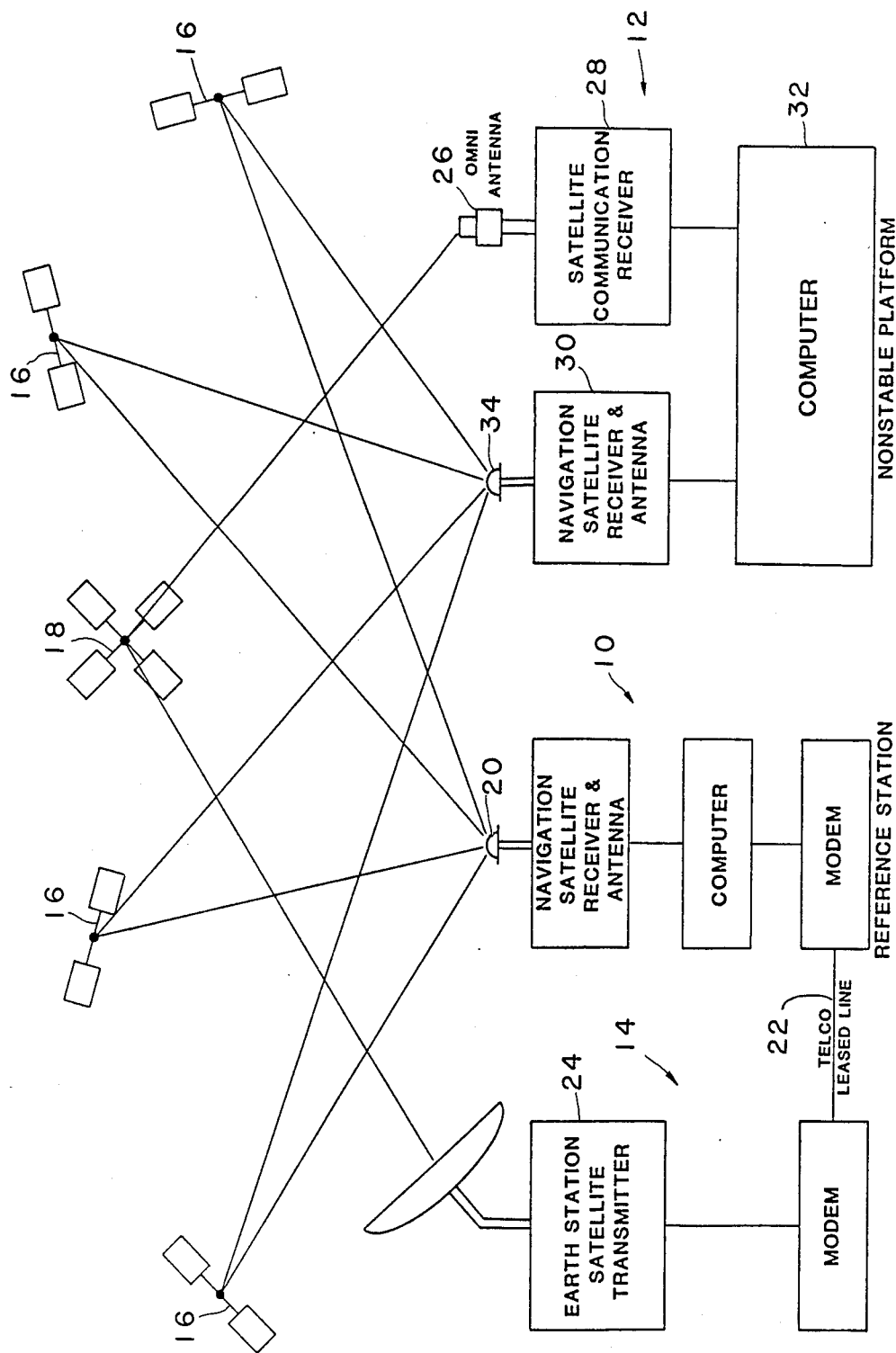
FIG. 1 is a block diagram of the logic and steps of this differential navigation system.

FIG. 1 illustrates a preferred embodiment for the differential navigation system. Reference receiver 10 is shown receiving navigation information from four navigation information system satellites 16. Reference receiver 10 includes antenna 20, a receiver unit, a computer and a modem. Reference receiver 10 decodes the navigation information received through antenna 20 and the receiver. Based upon the navigation information and the reference station's known location, differential corrections are computed for each of the satellites 16, formatted and transmitted via modem 10 and leased line 22 to the modem of transmitting unit 14.

Transmitting unit 14 receives the differential correction data, formats the data using spread spectrum techniques and pseudo random coding in transmitter unit 24 and transmit the coded signal to commercial geosynchronous earth satellite 18.

Commercial geosynchronous earth satellite 18 receives the signals transmitted by transmitting unit 24 and relays such signals via one of its own linearly polarized transponders.

User 12 is comprised of non-directional antenna 26, for communicating with the commercial geosynchronous earth satellite, satellite communication receiver 28, computer 32, antenna 34 for receiving navigation information from navigation information system satellites 16 and navigation information receiver 30. It should be noted that navigation information satellites 16 will travel in a lower earth orbit than a geosynchronous earth satellite. Moreover, government operated navigation information system satellites need not follow the same FCC restrictions on power and band width as are imposed upon commercial communication satellites. Hence, antenna 34 need not be operating under the same signal-to-noise constraints as antenna 26. It is conceivable that the functions of antenna 34 could be performed by antenna 26. In this case only antenna 26 would be required.

Navigation information receiver 30 outputs estimated location to computer 32. Satellite communication receiver 28 outputs differential corrections to computer 32. Computer 32 computes enhanced location information for user 12.

Figure 2:
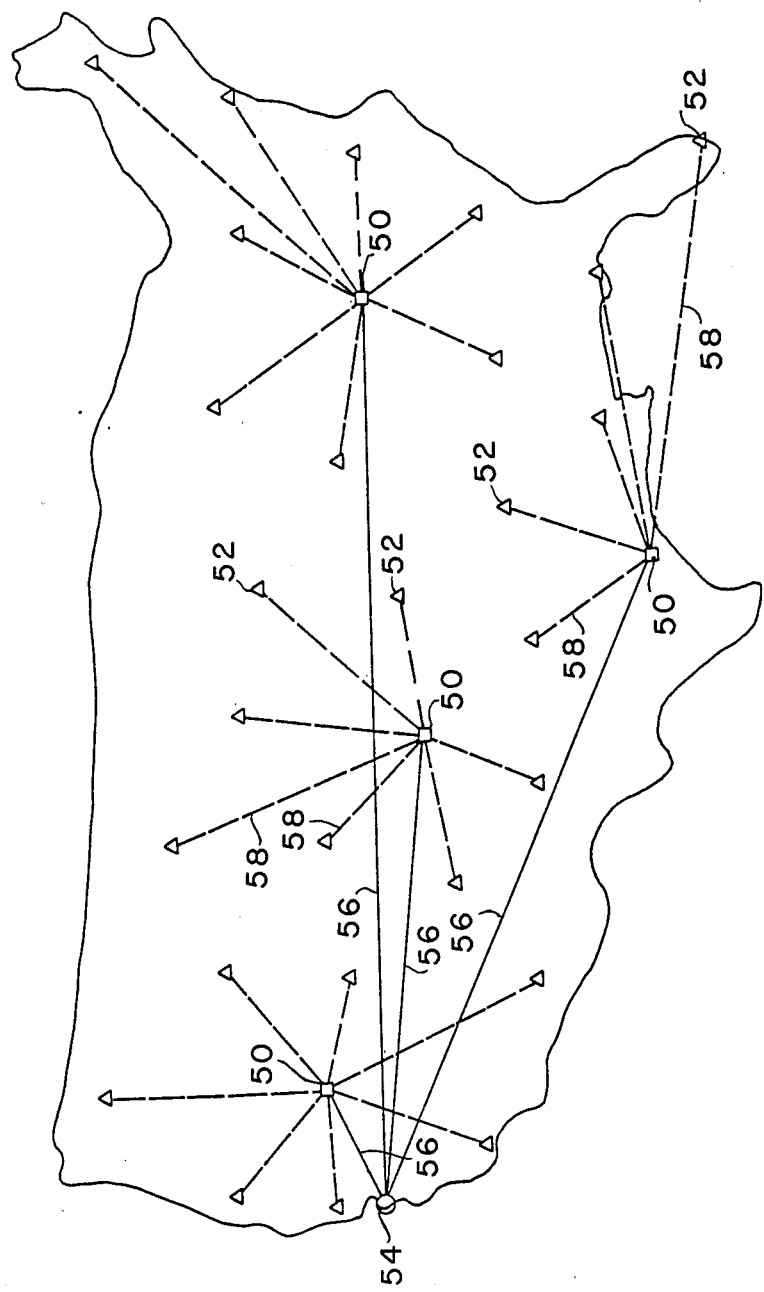
FIG. 2 illustrates acceptable, non-directional antenna patterns for the mobile unit differential data antenna.

In order for the differential navigation system to offer broad coverage for users, remote and non-remote, mobile and non-mobile, throughout the general North American area, a proposed set of reference receivers and their communications link is described in FIG. 2. Reference stations 52 and hub and reference stations 50 track the navigation information service and compute differential data. Differential data with their respective station identifiers are relayed to the network hub which in turn relays the data to master earth station 54, the transmitting unit. The preferred embodiment utilizes land lines 58 from reference stations 52 to network hubs 50 and land lines 56 from network hubs 50 to master earth station 54, the satellite uplink. It is conceivable for some of this communication link to take place through an earth satellite relay.

The differential data transmitted is preferably correlated, by appropriate identifiers, with the particular GPS epoch from which the data was derived. This permits a user to apply differential data to the same navigation information received at the user as was used in determining the differential data at the reference unit.

Figure 3B:
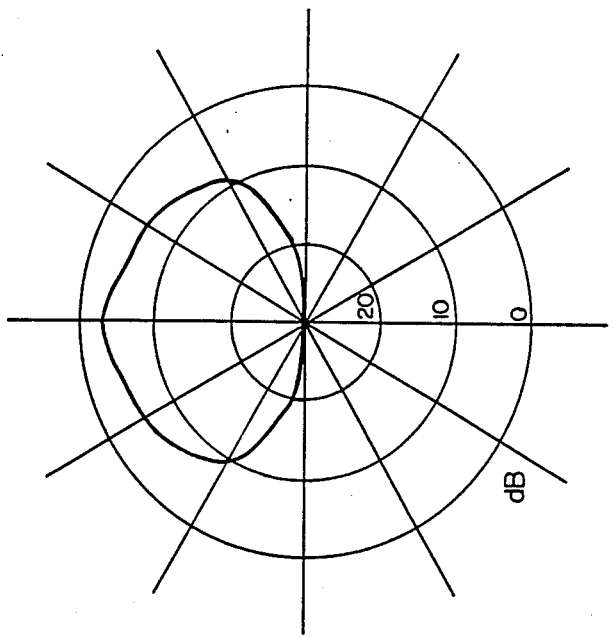
FIG. 3 illustrates a possible network of reference receivers throughout the continental United States.
Figure 3A:
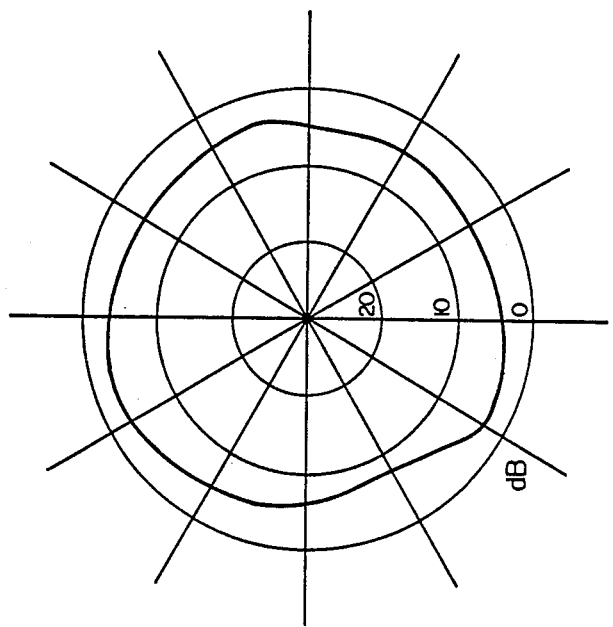

FIG. 3 illustrates the coverage patterns of a typical non-directional antenna. It can be seen that the particular non-directional antenna chosen exhibits reception capability for 360° in azimuth and for approximately 60° in elevation from the vertical. The lower gain resulting from using a non-directional antenna is roughly 25 dB less than a 24-inch dish. There is also a 3 dB loss due to circular polarization. However, there will be a 3 dB increase in gain due to using an essentially hemispherical vertical array. Therefore, the total gain loss due to using a non-directional circularly polarized antenna system would be 25 dB. This loss can be regained by increasing the process gain achieved through spread spectrum techniques. The total process gain for the preferred embodiment needs to be approximately 46 dB.

Differential data exists initially in digital binary form. According to spread spectrum techniques, each binary bit is reformatted into a word, possibly a long word, consisting of chips. Each word representing one binary bit might be several thousand chips long. Spreading a bit into a chip word yields process gain. In the preferred embodiment, a process gain of 46 dB translates into a chip word in excess of 10,000 chips per bit.

Figure 4A:
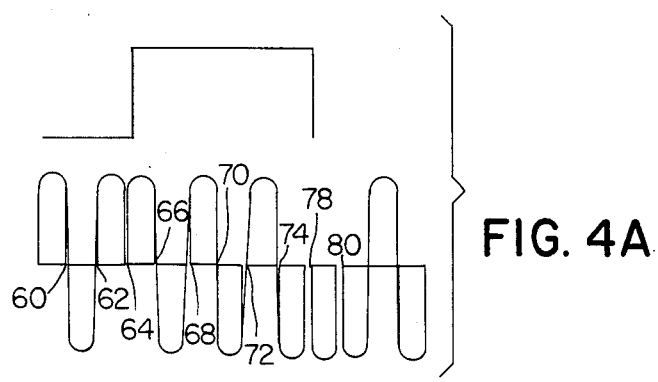
FIG. 4 illustrates pseudo random coding using spread spectrum techniques.

Each chip in a word may be either the equivalent of a chip-one or a chip-zero. A chip-one may be achieved by phase modulating the information frequency band every 180°. In that case, a chip-zero could be achieved by no modulation of the information frequency band at 180° of phase. FIG. 4A illustrates the process of phase modulation of a signal. At points 64, 78 and 80, corresponding to phase angles of 180° the signal is phase shifted.

Figure 4B:
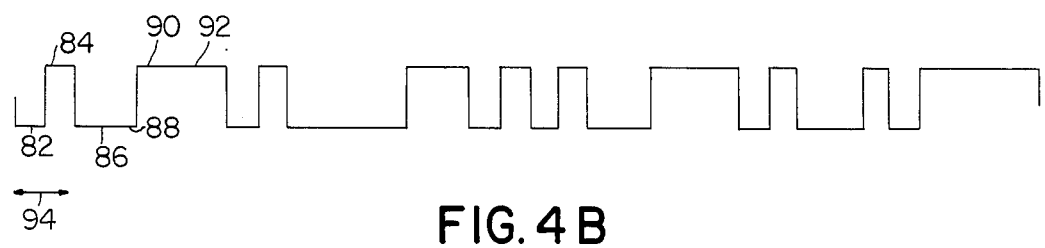

Each formatter of information is assigned two chip patterns. One chip pattern represents a binary one. The other chip pattern represents a binary zero. The chip pattern itself, although definite for that formatter of information and for all users of that formatter's transmissions, is selected to provide the minimum cross-correlation between formatters. This is referred to as pseudo-random coding. FIG. 4B illustrates a chip word. In the word 82, 84, 86, 88, 90 and 92 each illustrate a chip, either a chip-one or a chip-zero.

Picking code words such that the words exhibit minimum cross-correlation has the effect that multiple simultaneous transmission of such words within the same frequency band looks like noise. A particular user determines whether information is being transmitted for his use by determining whether his receiver detects correlation for his particular code word within the otherwise seeming signal noise.

Spread spectrum techniques employ a wide band width. The FCC limits earth satellite transponders to power per unit of band width, so use of a wide band width yields a power gain.

A receiver of a pseudo-randomly coded chip word need demand only a certain level of correlation between the pseudo random code stored in the user's receiver and the signals being received in order to make the decision that a binary one or a binary zero has been received. Given a sufficiently long chip word, noise can obscure part of the signal and the user can still determine a sufficiently high correlation between the imperfect signal received and the user's code word to determine that either a binary one or a binary zero has been transmitted. Hence, a process gain.

In the preferred embodiment, assuming an available spectrum space of 5.5 MHz and a process gain of 46 dB, the resulting data rate would be approximately 60 bits per second.

The preferred embodiment is designed to operate with the NAVSTAR GPS a the navigation information service. With NAVSTAR, each GPS satellite transmits at the same time. A user receiver times the arrival of each satellite signal to compute range to that satellite. Navigation data also transmitted is used to calculate the location of each satellite at the time of transmission. If the receiver's clock were perfectly aligned with the satellite clocks, a position solution could be achieved by just measuring the range to three satellites. In practice the user's clock will have some bias and the user receiver must track four satellites in order to remove the clock bias term. There are several other ways known in the field, besides or in addition to ranging, to determine position from the GPS satellites. One is to use integrated doppler, another is to use carrier beat phase measurements and another is to use carrier phase measurements.

Typical GPS differential data could consist of a range (known as pseudo-range) correction, a range-rate (or delta pseudo-range) correction, a carrier beat phase measurement or a carrier phase correction. Satellite identification and other satellite information may be included in the messages. Such a messages may be transmitted within 45 bits. A data rate of 60 bits per second yields the possibility of one update on each of 8 GPS satellites every 6 to 7 seconds. Such data rate is sufficient for high accuracy navigation by mobile units.

What is claimed is:

1. A differential naviagtion system applicable to mobile users and covering a wide geographic area, including remote regions, which comprises:
    a reference receiver of known location, situated no more than 500 miles from the user, which reference receiver receives information from a navigation information service, computes differential data of the location of said reference receiver with respect to the information from said navigation service and communicates said computed differential data to a transmitting unit;
    a transmitting unit that transmits, using spread spectrum techniques, sid computed differential data to a commercial geosynchronous earth satellite relay;
    a commercial geosynchronous earth satellite that receives and relays the transmitted signal through a linearly polarized transponder;
    a non-directional circularly polarized non-stabilized antenna at the user that receives the relayed signals;
    means for receiving navigation information at the user from the navigation information service; and
    processing means at the user that computes the location of the user using the navigation information and said computed differential data.

2. The system of claim 1, which further comprises using an earth satellite relay in the communication link between the reference receiver and the transmitting unit.

3. The system of claim 1, wherein the navigation information service is the NAVSTAR GPS.

4. The system of claim 1, wherein the differential data contains pseudo-range errors.

5. The system of claim 1, wherein the differential data contains delta pseudo-range errors.

6. The system of claim 1, wherein the differential data contains carrier beat phase measurement.

7. The system of claim 1, wherein the differential data contains carrier beat phase error.

8. The system of claim 1, wherein the navigation information used to compute the differential data is the same navigation information that is used by the processing means to compute the location of the user.

9. A differential navigation method applicable to mobile users and covering a wide geographic area, including remote regions, which comprises:
    receiving at a reference receiver of known location navigation information from a navigation information service;
    computing differential data of the location of said reference receiver with respect to the navigation information from said navigation service;
    communicating computed the differential data to a transmitting unit;
    transmitting, using spread spectrum techniques, the computed differential data to a commercial geosynchronous earth satellite relay;
    relaying the transmitted signals through a linearly polarized transponder on the earth satellite;
    receiving with a non-stable circularly polarized non-directional antenna, located at a user no more than 500 miles from the reference receiver, the signals relayed by the earth satellite transponder;

receiving at the user navigation information from the navigation information system; and computing at the user the location of the user using the navigation information and the computed differential data.

10. The method of claim 9, wherein the navigation information system is the NAVSTAR GPS.

11. The method of claim 9, wherein the communication link for the differential data from the reference receiver to the transmitting unit further comprises using an earth satellite relay.

* * * * *